US012217716B1

(12) United States Patent
Tseng et al.

(10) Patent No.: US 12,217,716 B1
(45) Date of Patent: Feb. 4, 2025

(54) CHOLESTEROL LIQUID CRYSTAL DISPLAY AND DRIVING METHOD THEREOF

(71) Applicant: AUO Corporation, Hsin-Chu (TW)

(72) Inventors: Heng-Yi Tseng, Hsin-Chu (TW); Yi-Han Tseng, Hsin-Chu (TW); Yi-Jyun Ke, Hsin-Chu (TW); Kun-Cheng Tien, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/604,543

(22) Filed: Mar. 14, 2024

(30) Foreign Application Priority Data

Jan. 8, 2024 (TW) ................................ 113100762

(51) Int. Cl.
*G09G 3/36* (2006.01)

(52) U.S. Cl.
CPC ... *G09G 3/3629* (2013.01); *G09G 2300/0486* (2013.01); *G09G 2310/061* (2013.01)

(58) Field of Classification Search
CPC .......... G09G 3/3629; G09G 3/36; G09G 3/00; G09G 3/34; G09G 3/20; G09G 2300/0486; G09G 2310/061
See application file for complete search history.

(56) References Cited

U.S. PATENT DOCUMENTS

| | | | | |
|---|---|---|---|---|
| 5,933,203 A | | 8/1999 | Wu et al. | |
| 6,816,227 B2 | * | 11/2004 | Mi | G02F 1/13718 349/86 |
| 7,351,506 B2 | * | 4/2008 | Schneider | G02F 1/13718 428/1.3 |
| 10,156,743 B1 | * | 12/2018 | Lin | G02F 1/13306 |
| 2010/0194794 A1 | * | 8/2010 | Nose | G09G 3/3614 345/691 |
| 2019/0072807 A1 | * | 3/2019 | Li | G02F 1/0126 |

FOREIGN PATENT DOCUMENTS

| | | |
|---|---|---|
| CN | 100535976 C | 9/2009 |
| CN | 111323975 A | 6/2020 |

* cited by examiner

*Primary Examiner* — Pegeman Karimi
(74) *Attorney, Agent, or Firm* — WPAT, PC

(57) ABSTRACT

A method for driving a cholesteric liquid crystal display, wherein the method includes steps as follows: Firstly, a reflective cholesteric liquid crystal panel including a pixel array composed of a plurality of pixel units is provided. Next, a scanning operation is performed on the pixel array. The scanning operation includes steps as follows: A continuous fixed pulse is applied to at least one of the plurality of pixel units lasting for a time period, so as to make a cholesterol liquid crystal layer of the at least one of the plurality of pixel units having a uniform lying helix (ULH) phase; and a maintaining pulse that is smaller than the continuous fixed pulse is applied to the at least one of the plurality of pixel units.

10 Claims, 9 Drawing Sheets

CHOLESTEROL LIQUID CRYSTAL DISPLAY AND DRIVING METHOD THEREOF

This application claims the benefit of Taiwan Application Serial No. 113100762 filed at Jan. 8, 2024, the subject matter of which is incorporated herein by reference.

BACKGROUND OF THE DISCLOSURE

Field of the Disclosure

The disclosure relates in general to a liquid crystal display and a driving method thereof, and more particularly to a driving method of a cholesteric liquid crystal display and a cholesteric liquid crystal display using the driving method.

Description of the Related Art

A cholesteric liquid crystal display is a display device using cholesteric liquid crystal. Since cholesteric liquid crystal has optical bistability which has two stable phases in its natural state, can maintain the displayed content without consuming power, saving energy, and has the advantages of high brightness, high contrast, power saving, memory, wide viewing angle, and no flickering, thus it has been successfully used in a variety of electronic products (such as e-books).

To take a reflective cholesteric liquid crystal display as an example, FIG. 1 is a diagram illustrating the molecules phase change in the cholesteric liquid crystal layer 102 of a reflective cholesteric liquid crystal display 100 according to the prior art. Wherein, the reflective cholesteric liquid crystal display 100 mainly includes a transparent substrate 101, a cholesteric liquid crystal layer 102 and a light-absorbing substrate 103. When an external voltage is applied, the liquid crystal molecules in the cholesteric liquid crystal layer 102 of the reflective cholesteric liquid crystal display 100 will be arranged according to the signal of the external voltage (as shown in the middle of FIG. 1) to display an image.

When no external voltage is applied, the liquid crystal molecules of the cholesteric liquid crystal layer 102 have two stable phases: either a planar phase (texture) or a focal conic phase. When the liquid crystal molecules of the cholesteric liquid crystal layer 102 are in the planar phase (as shown in the lower left corner of FIG. 1), of which the appearance is a reflective state to cause the incident light to be reflected by the cholesterol liquid crystal layer 102 and then directed outward, so as to make the screen of the reflective cholesteric liquid crystal display 100 appears in a bright state. Alternatively, when the liquid crystal molecules of the cholesterol liquid crystal layer 102 are in the focal conic phase (as shown in the lower right corner of FIG. 1), of which the appearance is a scattering (transparent) state to cause the incident light to be scattered by the cholesterol liquid crystal layer 102 and then absorbed by the light-absorbing substrate 103 when it passes through the cholesteric liquid crystal layer 102, so as to make the screen of the reflective cholesteric liquid crystal display 100 appears in a dark state.

However, when the liquid crystal molecules of the cholesteric liquid crystal layer 102 are in the focal conic phase, some of the light scattered by the cholesteric liquid crystal layer 102 is not completely absorbed by the light-absorbing substrate 103, but passes through the transparent substrate 101 and then emits outward. This may cause the screen of the reflective cholesteric liquid crystal display 100 in the dark state to appear a scattering white haze, greatly reducing the pixel contrast between the bright state and the dark state, and adversely affecting the pixel color saturation of the reflective cholesteric liquid crystal display 100.

Therefore, there is a need to provide an advanced method for driving a cholesteric liquid crystal display and a cholesteric liquid crystal display using the driving method to overcome the drawbacks of the prior art.

SUMMARY OF THE DISCLOSURE

One embodiment of the present disclosure is to provide a method for driving a cholesteric liquid crystal display, wherein the method includes steps as follows: Firstly, a reflective cholesteric liquid crystal panel including a pixel array composed of a plurality of pixel units is provided. Next, a scanning operation is performed on the pixel array. The scanning operation includes steps as follows: A continuous fixed pulse is applied to at least one of the plurality of pixel units lasting for a time period, so as to make a cholesterol liquid crystal layer of the at least one of the plurality of pixel units having a uniform lying helix (ULH) phase; and a maintaining pulse that is smaller than the continuous fixed pulse is applied to the at least one of the plurality of pixel units.

Another embodiment of the present disclosure is to provide a cholesteric liquid crystal display, wherein the cholesteric liquid crystal display includes a reflective cholesteric liquid crystal panel and a driving circuit. The reflective cholesteric liquid crystal panel includes a pixel array composed of a plurality of pixel units. The driving circuit is used to perform a scanning operation on the pixel array. The scanning operation includes steps as follows: A continuous fixed pulse is applied to at least one of the plurality of pixel units lasting for a time period, so as to make a cholesterol liquid crystal layer of the at least one of the plurality of pixel units having a ULH phase; and a maintaining pulse that is smaller than the continuous fixed pulse is applied to the at least one of the plurality of pixel units.

According to the above embodiments, the present disclosure provides a driving method for a reflective cholesteric liquid crystal display and a reflective cholesteric liquid crystal display using the driving method. During the scanning operation of the reflective cholesteric liquid crystal display, a continuous fixed pulse is applied to at least one of a plurality of pixel units lasting for a time period, so that the cholesteric liquid crystal layer of the at least one of the pixel units has a ULH phase. Instead of using the cholesteric liquid crystal layer in a focal conic phase to present the dark state of the reflective cholesteric liquid crystal display like the conventional technology does. This can prevent the reflective cholesteric liquid crystal display from appearing scattering white haze in the dark state, thereby improving the contrast of the reflective cholesteric liquid crystal display and increasing the pixel color saturation thereof.

BRIEF DESCRIPTION OF THE DRAWINGS

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The present disclosure provides a driving method for a reflective cholesteric liquid crystal display and a reflective cholesteric liquid crystal display using the driving method to improve the contrast of the reflective cholesteric liquid crystal display and increase the pixel color saturation thereof. The above and other aspects of the disclosure will become better understood with regard to the following detailed description of the preferred but non-limiting embodiment(s). The following description is made with reference to the accompanying drawings:

Several embodiments of the present disclosure are disclosed below with reference to accompanying drawings. However, the structure and contents disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the disclosure will be able to make suitable modifications or changes based on the specification disclosed below to meet actual needs without breaching the spirit of the disclosure. The present disclosure is applicable to other implementations not disclosed in the specification.

Figure 1:
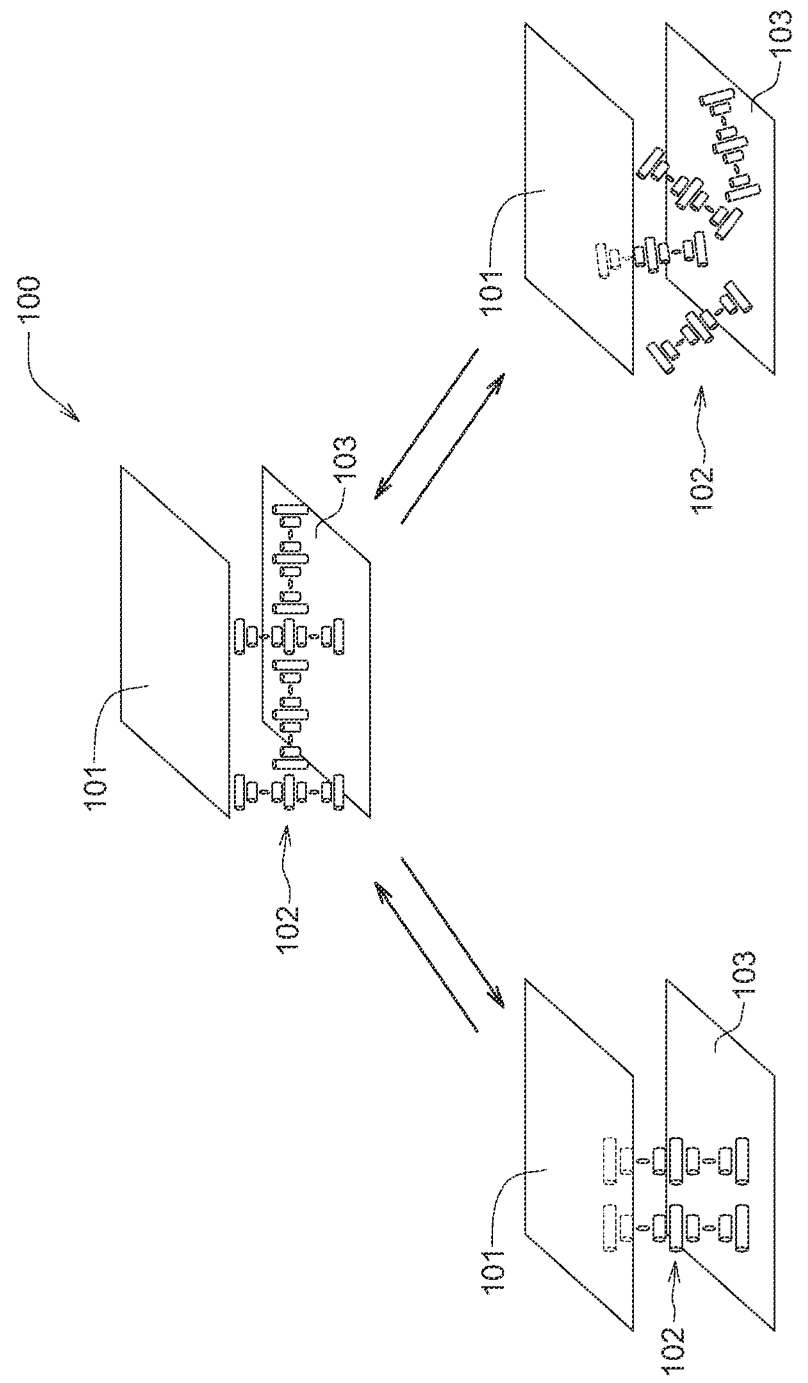
FIG. 1 (Prior Art)
FIG. 1 is a diagram illustrating the molecules phase change in the cholesteric liquid crystal layer of a reflective cholesteric liquid crystal display according to the prior art.
Figure 2A:
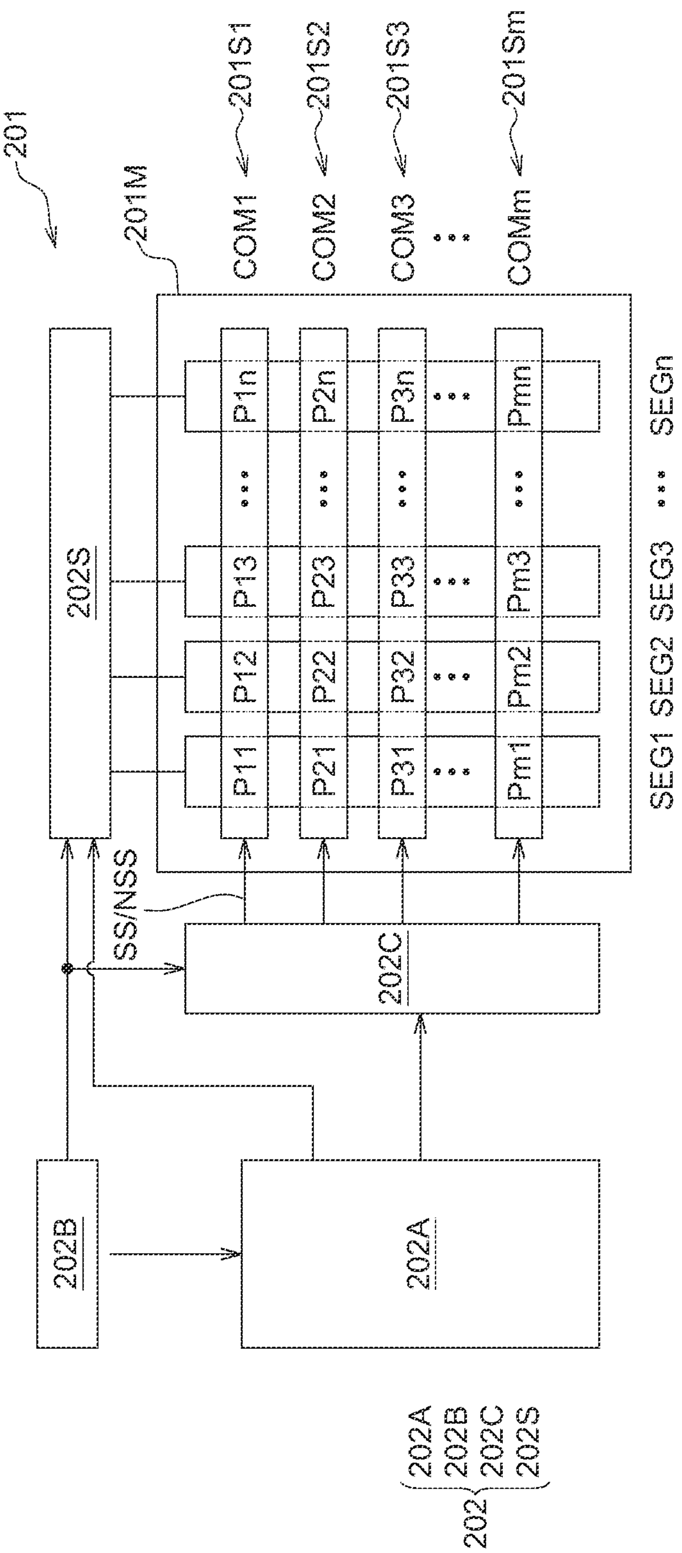
FIG. 2A is a diagram illustrating the configuration a reflective cholesteric liquid crystal display according to one embodiment of the present disclosure.

FIG. 2A is a diagram illustrating the configuration a reflective cholesteric liquid crystal display 200 according to one embodiment of the present disclosure. In some embodiments of the present disclosure, the reflective cholesteric liquid crystal display 200 includes a display panel 201 and a driving circuit 202. The driving circuit 202 includes a controller 202A, a power supply 202B, a common driver 202C and a section driver 202S.

As shown in FIG. 2A, the display panel 201 has a plurality of common electrodes (row electrodes) COM1, COM2 . . . COMm and a plurality of section electrodes (column electrodes) SEG1, SEG2 . . . SEGn. The common electrodes COM1, COM2 . . . COMm and the section electrodes SEG1, SEG2 . . . SEGn are arranged staggered with each other, and a cholesteric liquid crystal layer (not shown) is disposed between the common electrode COM1, COM2 . . . COMm and the segment electrodes SEG1, SEG2 . . . SEGn, thereby a plurality of pixel units P11, P12 . . . Pmn are defined at a plurality of intersections of the common electrodes COM1, COM2 . . . COMm and the segment electrodes SEG1, SEG2 . . . SEGn.

Wherein, a plurality of pixels (e.g., the pixels P11, P12 . . . P1*n*) that defined by the same common electrode (e.g., the common electrode COM1) constitute a pixel string (e.g., the pixel string 201S1); and a plurality of pixel strings (e.g., the pixel strings 201S1, 201S2 . . . 201Sm) constitute a pixel array 201M of the display panel 201. The display panel 201 displays an image frame based on the potential difference between the common electrodes COM1, COM2 . . . COMm and the section electrodes SEG1, SEG2 . . . SEGn.

For example, in one embodiment, a common driver 202C is correspondingly coupled to the common electrodes COM1, COM2 . . . COMm of the display panel 201 through a plurality of scan lines 203 for transmitting a selection signal SS or a non-selection signal NSS to the common electrodes COM1, COM2 . . . COMm respectively. A section driver 202S is correspondingly coupled to the section electrodes SEG1, SEG2 . . . SEGn of the display panel 201 through a plurality of data lines 204 and transmit a display signal DS to the segment electrodes SEG1, SEG2 . . . SEGn in respond to either the selection signal SS or the non-selection signal NSS output by the common driver 202C. According to the potential difference between the common electrodes COM1, COM2 . . . COMm and the section electrodes SEG1, SEG2 . . . SEGn (i.e., the potential difference between the selection signal SS or the non-selection signal NSS and the display signal DS) occurring at the staggered positions (pixel units) to determine the rotation direction of the liquid crystal molecules in the pixel units. Thereby, the image data is written into the pixel array 201M of the display panel 201 to form a frame of image and then being displayed at the display panel 201.

Figure 2B:
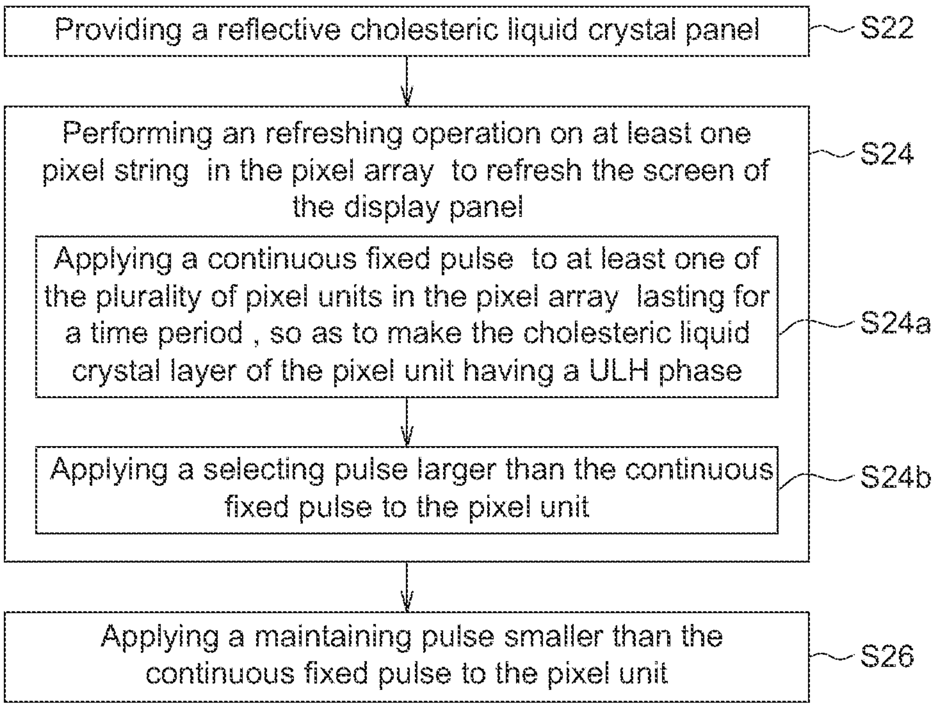
FIG. 2B is a flow chart illustrating a method for driving a reflective cholesteric liquid crystal display according to one embodiment of present disclosure.

FIG. 2B is a flow chart illustrating a method for driving a reflective cholesteric liquid crystal display 200 according to one embodiment of present disclosure. In some embodiments of the present disclosure, the method for driving the cholesteric liquid crystal display 200 includes steps as follows: Firstly, referring to step S22: A cholesteric liquid crystal display panel 201 (as shown in FIG. 2A) is provided.

Figure 3A:
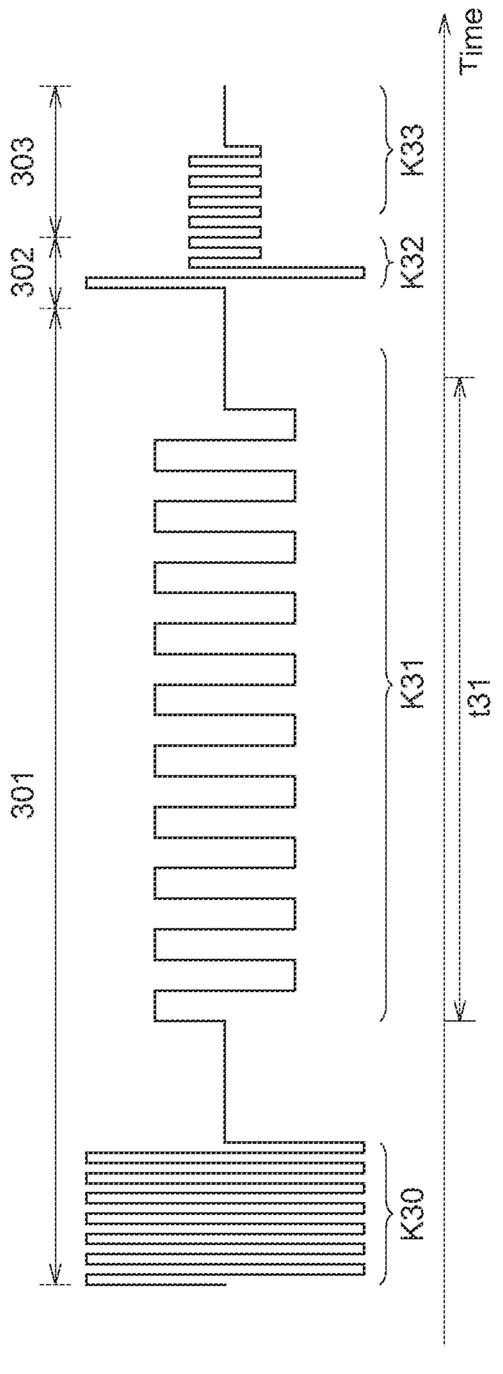
FIG. 3A is a timing diagram of a voltage pulse waveforms applied to a pixel unit in a pixel string of a pixel array when a scanning operation is performed on the pixel strings according to one embodiment of present disclosure.
Figure 3B:
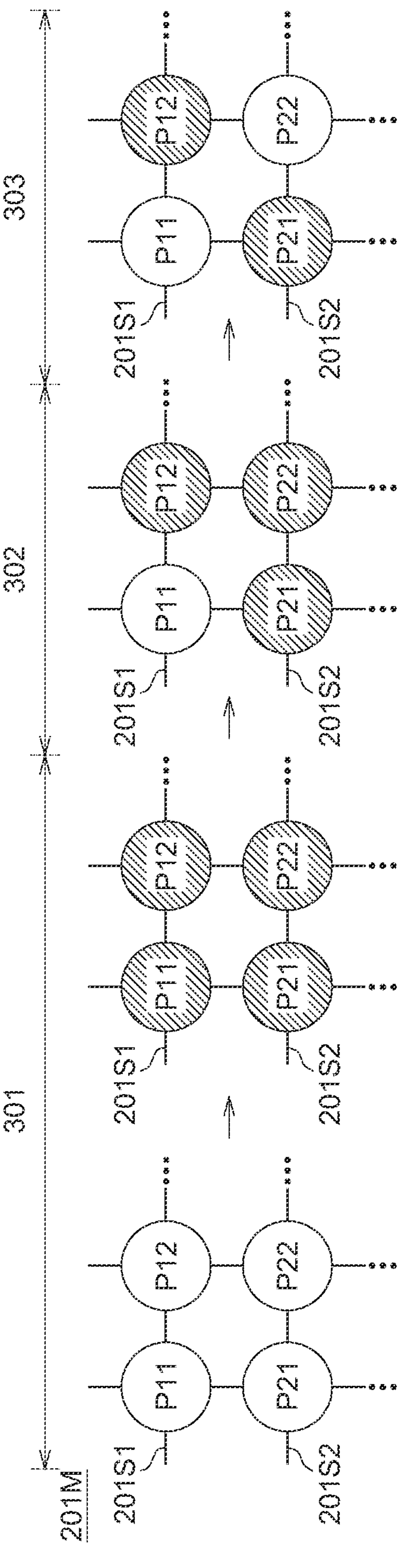
FIG. 3B is a diagram illustrating the displaying states of a plurality pixel units in the pixel array when the scanning operation as depicted in FIG. 3A is performed on a plurality pixel strings in the pixel array.

Next, referring to step S24: a refreshing operation is performed on at least one pixel string (e.g., the pixel string 201S1) in the pixel array 201M to refresh the screen of the display panel 201. FIG. 3A is a timing diagram of a voltage pulse waveforms applied to a pixel unit (e.g., the pixel unit P21) in a pixel string (e.g., the pixel string 201S1) of the pixel array 201M when a scanning operation is performed on the pixel string 201S1 according to one embodiment of present disclosure. FIG. 3B is a diagram illustrating the displaying states of a plurality pixel units (e.g., the pixel unit P21, P21 . . . Pnm) in the pixel array 201M when the scanning operation as depicted in FIG. 3A is performed on a plurality pixel strings (e.g., the pixel strings 201S1, 201S2 . . . 201Sm) in the pixel array 201M.

In some embodiments of the present disclosure, the above-mentioned scanning operation includes the following sub-steps: Firstly, referring to sub-step S24*a*: A continuous fixed pulse K31 is applied to at least one of the plurality of pixel units (e.g., the pixel unit P11) in the pixel array 201M lasting for a time period t31, so as to make the cholesteric liquid crystal layer 402 of the pixel unit P11 having a ULH phase.

Wherein, the frequency of the continuous fixed pulse K31 is substantially between 2 Hz and 150 Hz; preferably between 50 Hz and 100 Hz. The pulse voltage of the continuous fixed pulse K31 is substantially between 12V and 24V; preferably between 16V and 20V. The time period t31 is substantially between 0.5 seconds and 1.5 seconds; preferably between 1 second and 1.5 seconds. In some embodiments of the present disclosure, the frequency of the continuous fixed pulse K31 is 60 Hz; the pulse voltage of the continuous fixed pulse K31 is 20V; and the time period t31 is 1.5 seconds.

Figure 4:
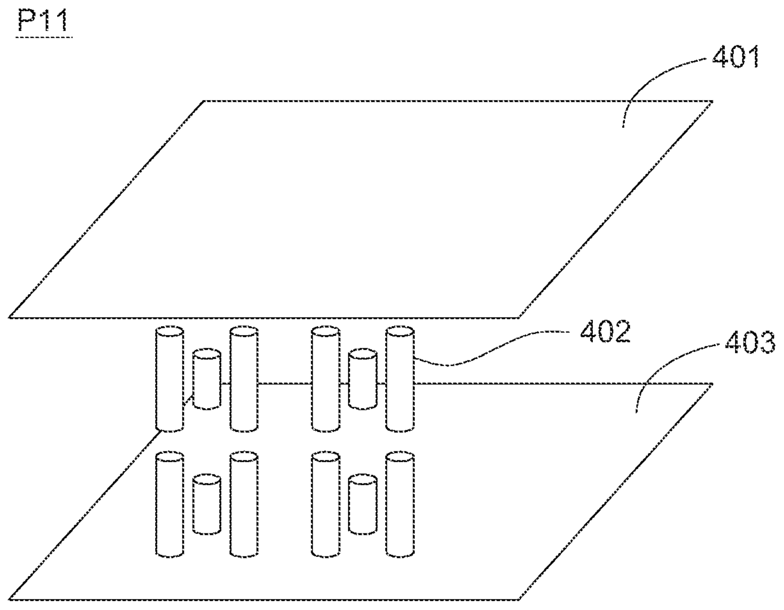
FIG. 4 is a diagram illustrating the phase changes of the cholesterol liquid crystal molecules in a cholesterol liquid crystal layer of a pixel unit, after a continuous fixed pulse is applied to the pixel unit of the pixel array lasting for a time period.

FIG. 4 is a diagram illustrating the phase changes of the cholesterol liquid crystal molecules in a cholesterol liquid crystal layer 402 of a pixel unit (e.g., the pixel unit P11) after the continuous fixed pulse K31 is applied to the pixel unit P11 of the pixel array 201M lasting for the time period t31. The continuous fixed pulse K31 can cause the cholesterol liquid crystal molecules of the cholesterol liquid crystal layer 402 in the pixel unit P11 having a ULH phase, due to the electro-hydrodynamic (EHD) effect of the cholesterol liquid crystal material. Such that, the incident light passing through the transparent substrate 401 to enter the pixel unit P11 from the outside can directly pass through the cholesteric liquid crystal layer 402 and then be absorbed by the light-absorbing substrate 403 disposed below the cholesteric liquid crystal layer 402. Thereby the pixel unit P11 appears in a dark state.

In the present embodiment, the step of applying the continuous fixed pulse to the at least one of the plurality of pixel units (e.g., at least one of the pixel units P11, P12 . . . Pnm) described in sub-step S24*a* may be performed in the reset stage 301 of the scanning operation, which includes applying the continuous fixed pulse K31 to each of the pixel units P11, P12 . . . Pnm in the pixel array 201M, so as to cause each of the pixel units P11, P12 . . . Pnm to be reset. Thereby, each of the pixel units P11, P12 . . . Pnm appears in a dark state (as shown in FIG. 3B).

Of note that, in some embodiments of the disclosure, in the reset stage 301 of the scanning operation, before applying the continuous fixed pulse K31 to each of the pixel units P11, P12 . . . Pnm in the pixel array 201M, an optional reset pulse K30 may be applied to each of the pixel units P11, P12 . . . Pnm in the pixel array 201M, so as to cause the cholesterol liquid crystal molecules of the cholesterol liquid crystal layer 402 in each of the pixel units P11, P12 . . . Pnm in a planar phase. Such that, each of the pixel units P11, P12 . . . Pnm appears in a bright state. In the present embodiment, the pulse voltage of the reset pulse K30 is greater than the pulse voltage of the continuous fixed pulse K31, and may preferably be 40V.

Then, referring to sub-step S24*b*: A selecting pulse K32 larger than the continuous fixed pulse K31 is applied to the pixel unit P11. For example, in the present embodiment, when performing the scanning operation on the pixel string 201S1, the selecting pulse K32 can be applied to the pixel unit P11 in the pixel string 201S1 through the common electrode COM1 and the section electrode SEG1 in the selecting stage 302, so that the arrangement of the cholesteric liquid crystal molecules in the cholesteric liquid crystal layer 402 of the pixel unit P11 may be converted from a ULH phase to a planar phase. Thereby the selected pixel unit P11 appears in a bright state. When performing a scanning operation on the series 202S2, the selecting pulse K32 can be applied to the pixel unit P22 in the pixel string 201S2 through the common electrode COM2 and the section electrode SEG2, so that the arrangement of the cholesterol liquid crystal molecules in the cholesterol liquid crystal layer 402 of the pixel unit P22 may be converted from a ULH phase to a planar phase, Thereby the selected pixel unit P22 appears in a bright (as shown in FIG. 3B).

Subsequently, referring top step S26: a maintaining pulse K33 smaller than the continuous fixed pulse K31 is applied to the pixel unit P11. When performing a scanning operation on the pixel string 201S1, the maintaining pulse K33 can be applied to the pixel units P11 . . . Pn of the pixel string 201S1 through the common electrode COM1 and the section electrodes SEG1 . . . SG1*n* in a non-selecting stage 303, so as to make the selected pixel unit P11 appearing in a bright state and to make the unselected pixel units P12 . . . P1*n* appearing in a dark state.

When performing a scanning operation on the pixel string 201S2, the maintaining pulse K33 can be applied to the pixel units P21 . . . P2*n* of the pixel string 201S2 through the common electrode COM1 and the section electrodes SEG1 . . . SG1*n* in a non-selecting stage 303, so as to make the selected pixel unit P22 appearing in a bright state and to make the unselected pixel units P21, P23 . . . P1*n* appearing in a dark state (as shown in FIG. 3B).

By applying the continuous fixed pulse K31 to at least one of the pixel units (e.g., the pixel unit P11), the cholesterol liquid crystal molecules of the cholesterol liquid crystal layer 402 in the pixel unit P11 can be converted in a ULH phase, instead of using the cholesteric liquid crystal layer 102 with a focal conic phase as the conventional technology does, to preset the dark state of the at least one of the pixel units (e.g., at least one of the pixel units P11, P12 . . . Pnm) in the reflective cholesteric liquid crystal display 200. This can prevent the reflective cholesteric liquid crystal display 200 from appearing scattering white haze in the dark state, thereby improving the contrast of the reflective cholesteric liquid crystal display 200 and increasing the pixel color saturation thereof.

However, it should be appreciated that the method for driving the reflective cholesteric liquid crystal display 200 is not limited to this regard. For example, in some embodiments of the present disclosure, during the scanning operation of the reflective cholesteric liquid crystal display 200, the step of applying the selection pulse K32 to at least one of the pixel units (e.g., at least one of the pixel units P11, P12 . . . Pnm) may be omitted.

Figure 5A:
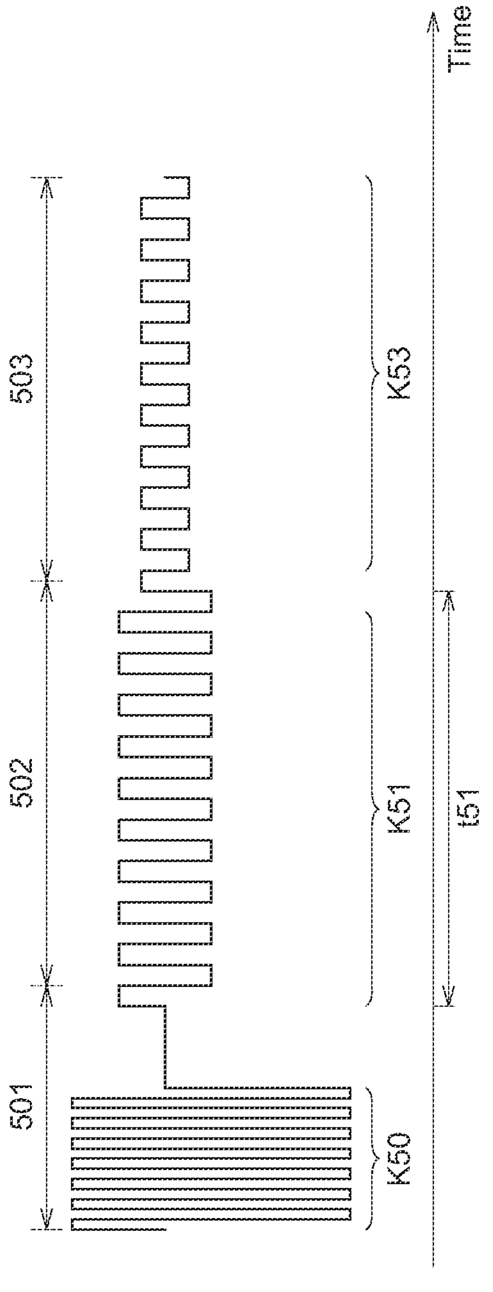
FIG. 5A is a timing diagram of a voltage pulse waveforms applied to a pixel unit in a pixel string of a pixel array when a scanning operation is performed on the pixel string according to another embodiment of present disclosure.
Figure 5B:
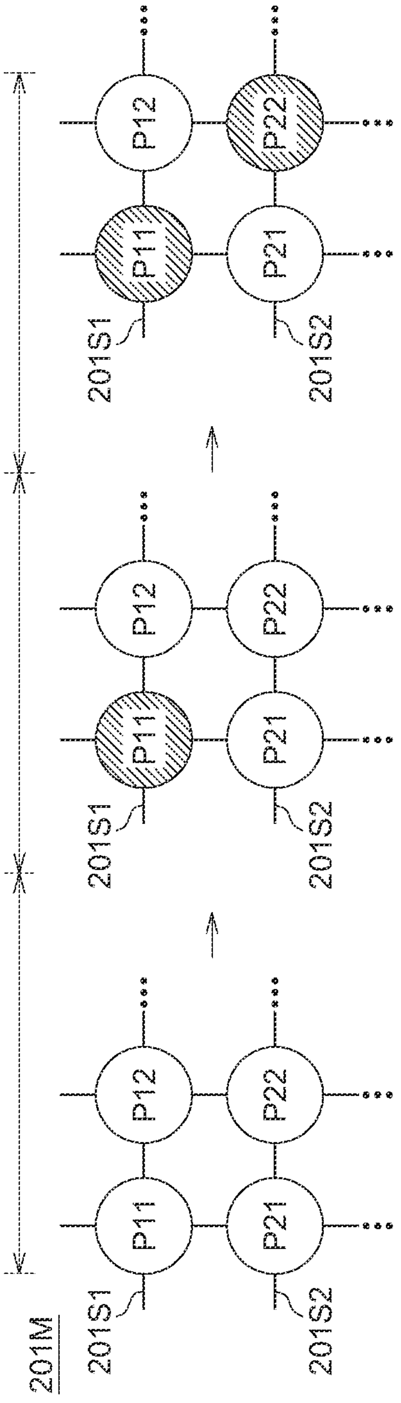
FIG. 5B is a diagram illustrating the displaying state of the pixel units in the pixel array when the scanning operation as depicted in FIG. 5A is performed on a plurality of pixel strings in the pixel array.

FIG. 5A is a timing diagram of a voltage pulse waveforms applied to a pixel unit (e.g., the pixel unit P11) in a pixel string (e.g., the pixel string 201S1) of a pixel array 201M when a scanning operation is performed on the pixel string 201S1 according to another embodiment of present disclosure; FIG. 5B is a diagram illustrating the displaying states of a plurality pixel units (e.g., the pixel unit P21, P21 . . . Pnm) in the pixel array 201M when the scanning operation as depicted in FIG. 5A is performed on a plurality pixel strings (e.g., the pixel strings 201S1, 201S2 . . . 201Sm) in the pixel array 201M.

In the present embodiment, as shown in FIG. 5B, in the selecting stage 502 of the scanning operation, the sub-step S24*a* described in FIG. 2 can be directly carried out to determine (select) the displaying states of the pixel units (e.g., the pixel unit P11, P12 . . . Pnm) in the pixel string 201S1 on which the scanning operation is performed.

Prior to the selecting stage 502, as shown in FIG. 5A, and in the reset stage 501, a reset pulse K50 is firstly applied to each of the pixel units P11, P12 . . . Pnm in the pixel array 201M, so as to reset each of the pixel units P11, P12 . . . Pnm, thus to make each of the pixel units P11, P12 . . . Pnm appearing in a bright state (shown in FIG. 5B).

In the selecting stage 502 of the scanning operation performed on the pixel string 201S1, a continuous fixed pulse K51 is applied to the pixel unit P11 in the pixel string 201S1 through the common electrode COM1 and the section electrode SEG1 (lasting for a time period t51), so that the arrangement of the cholesteric liquid crystal molecules in the cholesteric liquid crystal layer 402 of the pixel unit P11 can be converted from a planar phase to a ULH phase. Thereby, the selected pixel unit P11 appears in a dark state.

In the selecting stage 502 of the scanning operation performed on the pixel string 201S2, a continuous fixed pulse K51 is applied to the pixel unit P22 in the pixel string 201S2 through the common electrode COM2 and the section electrode SEG2 (lasting for a time period t51), so that the arrangement of the cholesteric liquid crystal molecules in the cholesteric liquid crystal layer 402 of the pixel unit P22 can be converted from a planar phase to a ULH phase. Thereby, the selected pixel unit P22 appears in a dark state.

Subsequently, sub-step S26 as described in FIG. 2B is performed to apply a maintaining pulse K53 smaller than the continuous fixed pulse K51 to the pixel units (e.g., the pixel units P11 . . . P1*n*) in the pixel series 201S1. In the non-selecting phase 503 of the scanning operation performed on the pixel string 201S1, the maintaining pulse K53 can be applied to the pixel units P11 . . . P1*n* in the pixel series 201S1 through the common electrode COM1 and the section electrodes SEG1 . . . SG1*n*, so that the selected pixel unit P11 continues to appear in a dark state, and the unselected pixel units P12 . . . P1*n* continues to appear in a bright state.

In the non-selecting phase 503 of the scanning operation performed on the pixel string 201S2, the maintaining pulse K53 can be applied to the pixel units P21 . . . P2*n* in the pixel series 201S2 through the common electrode COM2 and the section electrodes SEG2 . . . SG2*n*, so that the selected pixel unit P22 continues to appear in a dark state, and the unselected pixel units P21, P23 . . . P2*n* continues to appear in a bright state.

By applying the continuous fixed pulse K51 to at least one of the pixel units (e.g., the pixel unit P11), the cholesterol liquid crystal molecules of the cholesterol liquid crystal layer 402 in the pixel unit P11 can be converted in a ULH phase, instead of using the cholesteric liquid crystal layer 102 with a focal conic phase as the conventional technology does, to preset the dark state of the at least one of the pixel units (e.g., at least one of the pixel units P11, P12 . . . Pnm) in the reflective cholesteric liquid crystal display 200. This can prevent the reflective cholesteric liquid crystal display 200 from appearing scattering white haze in the dark state, thereby improving the contrast of the reflective cholesteric liquid crystal display 200 and increasing the pixel color saturation thereof.

Figure 6A:
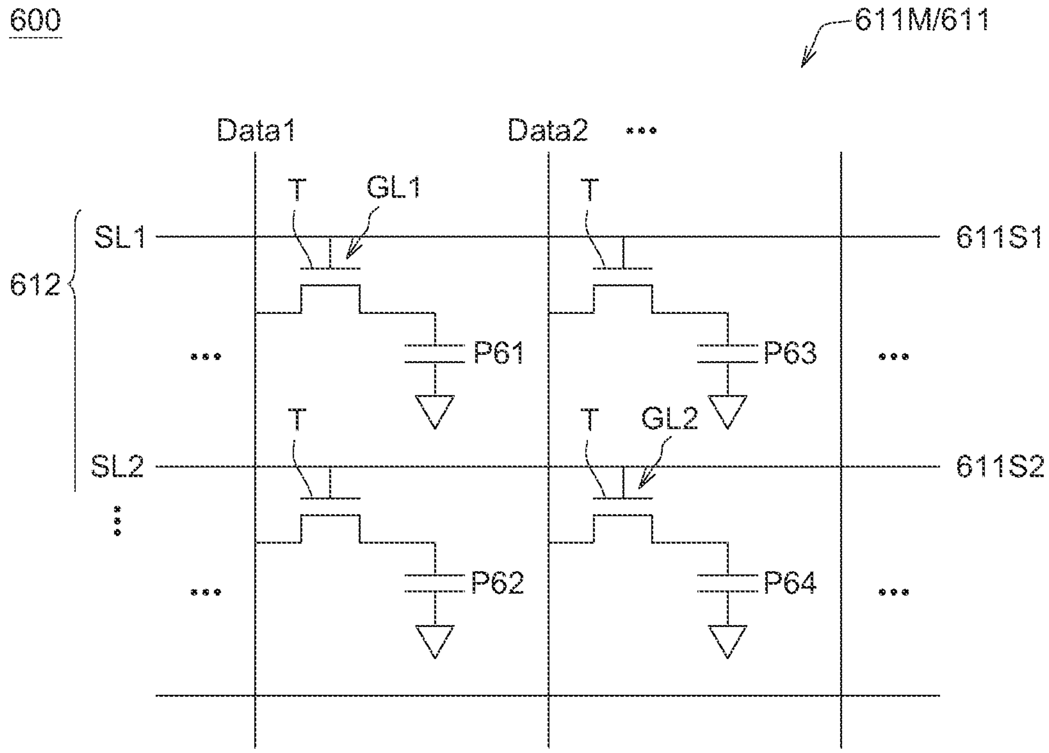
FIG. 6A is a diagram illustrating the configuration a reflective cholesteric liquid crystal display according to another embodiment of the present disclosure.
Figure 6B:
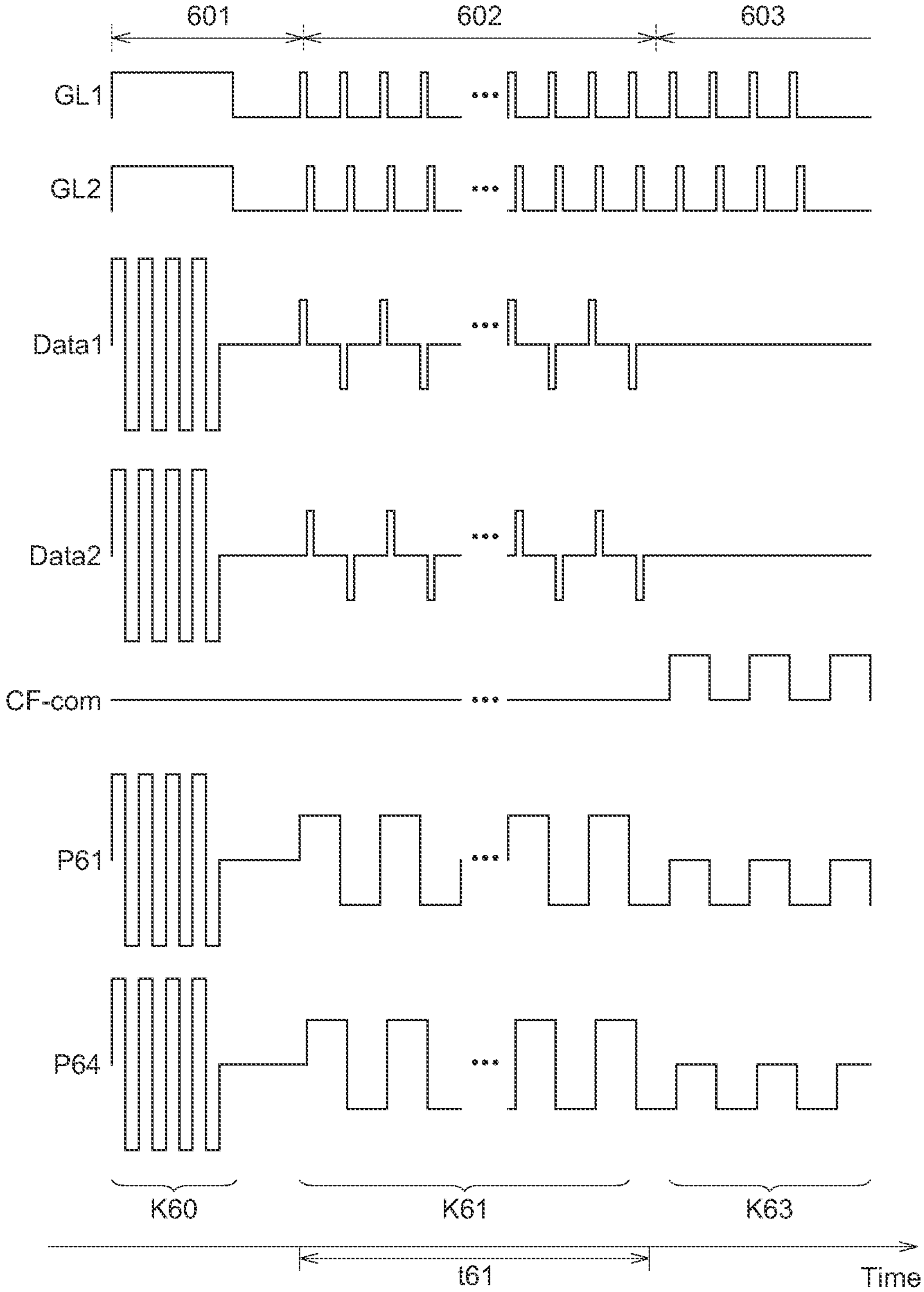
FIG. 6B is a timing diagram of a voltage pulse waveforms for driving the reflective cholesteric liquid crystal display depicted in FIG. 6A using the method as described in FIG. 2B.
Figure 6C:
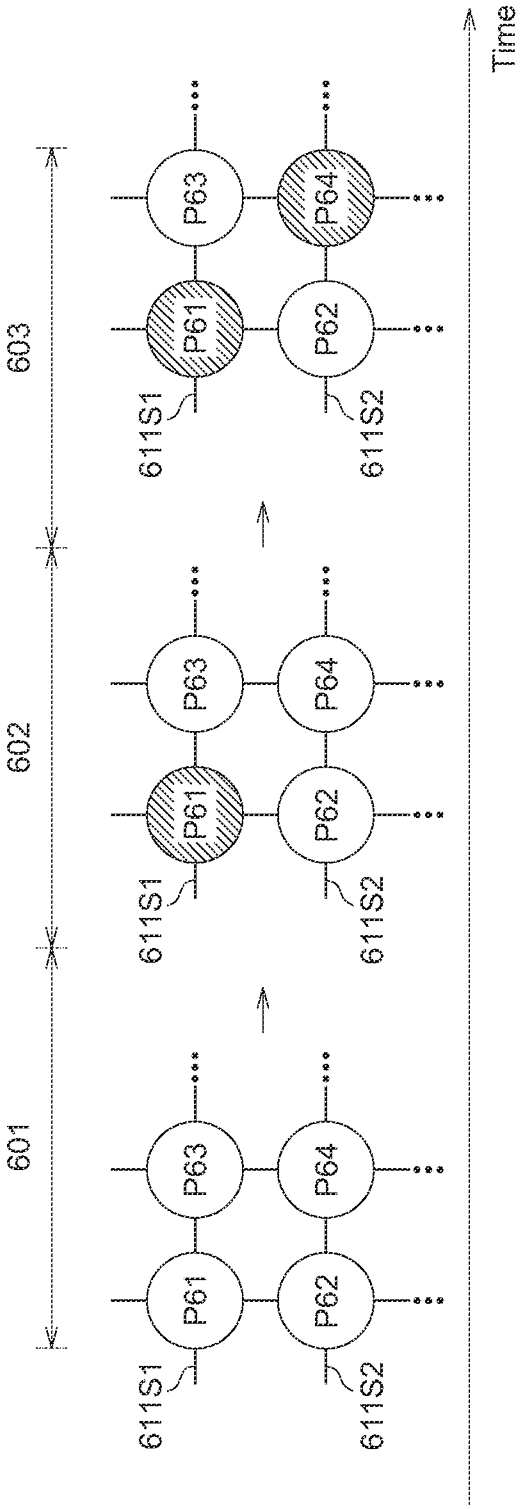
FIG. 6C is a diagram illustrating the displaying state of the pixel units in the pixel array when the scanning operation is performed on the pixel strings as depicted in FIG. 6A.

In addition, the method for driving the reflective cholesteric liquid crystal display as shown in FIG. 2B is not only applicable to the reflective cholesteric liquid crystal display 200 with a passive matrix as shown in FIG. 2A, but is also applicable to the display with an active matrix. FIG. 6A is a diagram illustrating the configuration a reflective cholesteric liquid crystal display 600 according to another embodiment of the present disclosure. FIG. 6B is a timing diagram of a voltage pulse waveforms for driving the reflective cholesteric liquid crystal display 600 depicted in FIG. 6A using the method as described in FIG. 2B. FIG. 6C is a diagram illustrating the displaying state of the pixel units (e.g., the pixel units P61, P62, P63, P64) in the pixel array 601M when the scanning operation is performed on the pixel strings (e.g., 611S1, 611S2, . . . ) as depicted in FIG. 6A.

As shown in FIG. 6A, the reflective cholesteric liquid crystal display 600 includes a display panel 611 and a driving circuit 612. The display panel 611 includes a pixel array 611M composed of a plurality of pixel units (e.g., the pixel units P61, P62, P63, and P64). The driving circuit 612 includes a plurality of scan lines (e.g., the scan lines SL1, SL2 . . . ), a plurality of corresponding data lines (e.g., the data lines Data1, Data2 . . . ) and a plurality of transistors T. Wherein, the gate electrode (e.g., the gate electrode GL1, GL2 . . . ) of each transistor T is connected to the corresponding scan line (e.g., the scan lines SL1, SL2 . . . ); the source electrode of each transistor T are respectively electrically connected to the corresponding data lines (e.g., the data lines Data1, Data2 . . . ); the drain electrode of each transistor T is electrically connected to the corresponding pixel units (e.g., the pixel units P61, P62, P63, P64).

The scanning operation as shown in FIG. 2B can be performed by controlling the on/off of the transistor T through the scan lines (e.g., the scan lines SL1, SL2 . . . ) and \ the corresponding data lines (e.g., the data lines Data1, Data2 . . . ) to apply the reset voltage K60, the continuous fixed pulse K61 and the maintaining pulse K63 to the pixel array 611M respectively.

As shown in FIG. 6B, in the reset stage 601 of the scanning operation, a reset voltage K60 is applied to the pixel units (e.g., the pixel units P61, P62, P63, P64) in the pixel array 611M, so as to make the arrangement of the cholesterol liquid crystal molecules in the pixel unit (e.g., the pixel units P61, P62, P63, P64) in a planar phase. Thereby, each of the pixel units (e.g., each of the pixel units P61, P62, P63, P64) appears in a bright state.

By controlling the on/off of the transistor T, in the selecting stage 602 of the scanning operation on the pixel string 611S1 (including the pixel units P61 and P63), a continuous fixed pulse K61 is applied to the selected pixel unit P61 (lasting for a time period t61), the arrangement of the cholesterol liquid crystal molecules in the selected pixel unit P61 can be converted from a planar phase to a ULH state. Thereby the pixel unit P61 appears in a dark state.

In the selecting stage 602 of the scanning operation performed on the pixel string 611S2 (including the pixel units P62 and P64), a continuous fixed pulse K61 is applied to the selected pixel unit P64 (lasting for a time period t61), the arrangement of the cholesterol liquid crystal molecules in the selected pixel unit P64 can be converted from a planar phase to a ULH state. Thereby the pixel unit P61 appears in a dark state.

By controlling the on/off of the transistor T, in the non-selecting stage 603, a maintaining pulse K63 is applied to the pixel units (e.g., the pixel units P61, P62, P63, P64) in the pixel stings 611S1 and 611S2, so as to make the selected pixel units P61 and P64 continuously appearing in a dark state, and to make the unselected pixel units P62 and P63 continuously appearing in a bright state.

According to the above embodiments, the present disclosure provides a driving method for a reflective cholesteric liquid crystal display and a reflective cholesteric liquid crystal display (such as the reflective cholesteric liquid crystal display 200 or 600) using the driving method. During the scanning operation of the reflective cholesteric liquid crystal display, a continuous fixed pulse (such as the continuous fixed pulse K31, K51 or K61) is applied to at least one of a plurality of pixel units (such as the pixel units P11 or P61) in a pixel array (such as the pixel array 201M or 601M) lasting for a time period, so that the cholesteric liquid crystal layer of the at least one of the pixel units has a ULH phase. Instead of using the cholesteric liquid crystal layer in a focal conic phase to present the dark state of the reflective cholesteric liquid crystal display like the conventional technology does. This can prevent the reflective cholesteric liquid crystal display (e.g., the reflective cholesteric liquid crystal display 200 or 600) from appearing scattering white haze in the dark state, thereby improving the contrast of the reflective cholesteric liquid crystal display (e.g., the reflective cholesteric liquid crystal display 200 or 600) and increasing the pixel color saturation thereof.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for driving a cholesteric liquid crystal display, comprising:

providing a reflective cholesteric liquid crystal panel comprising a pixel array composed of a plurality of pixel units; and performing a scanning operation on the pixel array, wherein the scanning operation comprises:

applying a continuous fixed pulse to at least one of the plurality of pixel units lasting for a time period, so as to make cholesterol liquid crystal layer of the at least one of the plurality of pixel units having a uniform lying helix (ULH) phase; and applying a maintaining pulse that is smaller than the continuous fixed pulse to the at least one of the plurality of pixel units.

2. The method according to claim 1, wherein the continuous fixed pulse has a frequency substantially between 2 Hz and 150 Hz and a pulse voltage substantially between 12V and 24V; and the time period is substantially between 0.5 seconds and 1.5 seconds.

3. The method according to claim 1, wherein the step of applying the continuous fixed pulse to the at least one of the plurality of pixel units comprises applying the continuous fixed pulse to each of the plurality of pixel units.

4. The method according to claim 3, prior to applying the continuous fixed pulse to each of the plurality of pixel units, further comprising applying a reset pulse greater than the continuous fixed pulse to each of the plurality of pixel units, so as to make a cholesterol liquid crystal layer of each of the plurality of pixel units having a planer phase and to make the each of the plurality of pixel units appearing in a bright state.

5. The method according to claim 3, wherein after applying the continuous fixed pulse to each of the plurality of pixel units, the scanning operation further comprises:

applying a selecting pulse substantially greater than the continuous fixed pulse to the at least one of the plurality of pixel units; and then applying the maintaining pulse to the at least one of the plurality of pixel units.

6. The method according to claim 1, prior to applying the continuous fixed pulse to the at least one of the plurality of pixel units, further comprising applying a reset pulse greater than the continuous fixed pulse to each of the plurality of pixel units, so as to make a cholesterol liquid crystal layer of each of the plurality of pixel units having a planer phase and to make the each of the plurality of pixel units appearing in a bright state.

7. The method according to claim 6, wherein an address selecting can be performed by applying the continuous fixed voltage pulse to the at least one of the plurality of pixel units in the scanning operation, and then the maintaining pulse is applied to the at least one of the plurality of pixel units.

8. A cholesteric liquid crystal display, comprising:

a reflective cholesteric liquid crystal panel, including a pixel array composed of a plurality of pixel units;

a driving circuit, used to perform a scanning operation on the pixel array, wherein the scanning operation comprises:

applying a continuous fixed pulse to at least one of the plurality of pixel units lasting for a time period, so as to make cholesterol liquid crystal layer of the at least one of the plurality of pixel units having a ULH phase; and applying a maintaining pulse that is smaller than the continuous fixed pulse to the at least one of the plurality of pixel units.

9. The cholesteric liquid crystal display according to claim 8, wherein the driving circuit comprises:

a plurality of signal lines, electrically connected to the pixel array; and a plurality of scan lines, electrically connected to the pixel array for performing the scanning operation.

10. The cholesteric liquid crystal display according to claim 9, wherein the driving circuit further comprises a plurality of transistors, electrically connected to the plurality of signal lines and the plurality of scan lines, used to control turning on or off of the plurality of signal lines and the plurality of scan lines for performing the scanning operation.

* * * * *